United States Patent

[11] 3,604,957

| [72] | Inventor | Otto G. Satula<br>Oak Creek, Wis. |
|---|---|---|
| [21] | Appl. No. | 821,351 |
| [22] | Filed | May 2, 1969 |
| [45] | Patented | Sept. 14, 1971 |
| [73] | Assignee | Electronic Construction Corp.<br>Milwaukee, Wis. |

[54] TEMPERATURE MEASUREMENT HAVING SENSOR AND REFERENCE DIODES AT INPUTS OF REGENERATIVE DIFFERENTIAL AMPLIFIER
5 Claims, 1 Drawing Fig.

[52] U.S. Cl. .................................................. 307/310,
330/30 D, 328/3, 307/229, 324/106, 330/104,
307/235, 307/317
[51] Int. Cl. ..................................................... H03k 17/14,
H03k 17/74
[50] Field of Search .......................................... 307/310,
229; 330/104, 30 D, 1 A; 324/106; 328/3

[56] References Cited
UNITED STATES PATENTS
| 2,573,661 | 10/1951 | Deubel ........................ | 328/3 |
| 3,028,473 | 4/1962 | Dyer et al. ................... | 307/310 |
| 3,067,340 | 12/1962 | Hodges ....................... | 307/310 |
| 3,106,647 | 10/1963 | Danko ........................ | 307/310 |
| 3,395,265 | 7/1968 | Weir ........................... | 307/310 |
| 3,421,375 | 1/1969 | Dimon ........................ | 307/310 |
| 3,431,508 | 3/1969 | Soltz et al. .................. | 330/30 |
| 3,465,175 | 9/1969 | Sutton ........................ | 307/310 |

OTHER REFERENCES
" Differential Heat Detector" by J. W. Reed in IBM Technical Disclosure Bulletin, Vol. 10 No. 12 May 1968. (Copy in 307/310)

*Primary Examiner*—Donald D. Forrer
*Assistant Examiner*—Harold A. Dixon
*Attorney*—Wheeler, House & Wheeler

ABSTRACT: A differential-temperature-sensing system including a temperature-sensing network having a linear voltage drop characteristic to provide a differential voltage input signal to an amplifier which is balanced to provide a set output voltage when the differential input voltage is zero and a monitoring network having a feedback circuit connected to the amplifier input to trigger the amplifier in response to a change in the set output voltage.

PATENTED SEP 14 1971
3,604,957
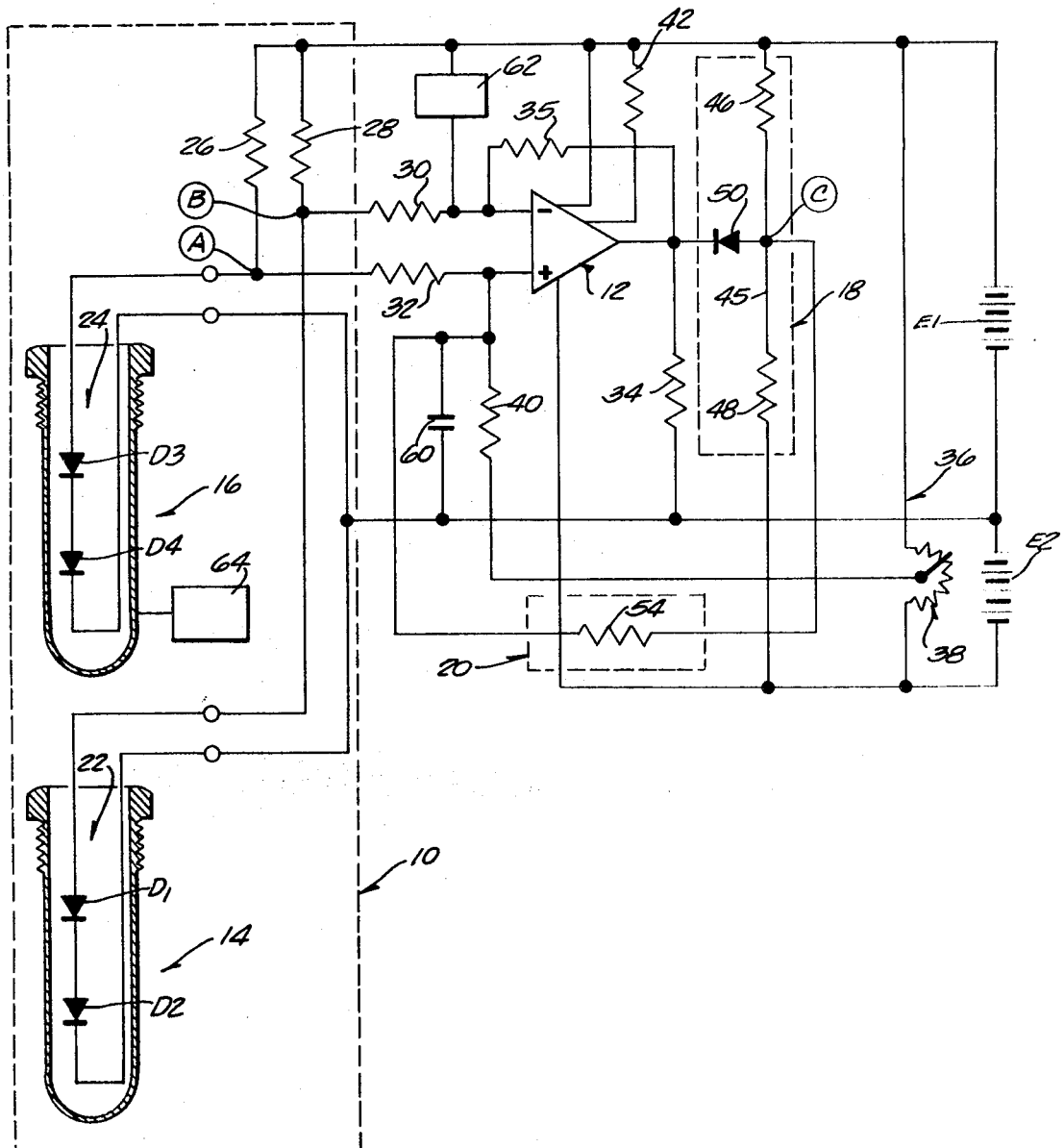
Inventor
Otto G. Salata
By
Wheeler, Wheeler, House & Clemency
Attorneys

3,604,957

TEMPERATURE MEASUREMENT HAVING SENSOR AND REFERENCE DIODES AT INPUTS OF REGENERATIVE DIFFERENTIAL AMPLIFIER

BACKGROUND OF THE INVENTION

Control circuits for monitoring differences in temperature between two or more remote points are well known and generally include a set of thermistors to provide the differential temperature signal. The thermistors have nonlinear resistance characteristics and require complex matching in order to obtain two nonlinear thermistors which are the same. Once a set of thermistors has been selected, complicated circuitry is required in order to provide a temperature-responsive differential voltage signal with any degree of linearity.

SUMMARY OF THE INVENTION

The temperature-sensing system disclosed herein provides a highly accurate indication of the temperature difference between one or more remotely located apparatus and a reference temperature. The differential voltage signal produced by the sensing system can be used to provide monitor and control functions for various industrial devices. This system includes a temperature-sensing network having semiconductor junction devices with linear voltage drop characteristics connected to provide a differential voltage input signal to an amplifier in response to changes in temperature from a reference temperature. The differential voltage signal is amplified and monitored to provide a feedback voltage to the amplifier input in response to a drop from the set output voltage of the amplifier. The feedback voltage triggers the amplifier to a far negative potential providing a signal for control or warning function.

Other objects and advantages will be apparent from the following detailed description when read in connection with the accompanying drawing in which a circuit diagram of the temperature-sensing system of this invention is shown.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The differential-temperature-sensing system of this invention includes a temperature-sensing network 10 connected to an amplifier 12 to provide a differential voltage input signal to the amplifier in response to the differential temperature existing between a reference probe 14 and a remote probe 16. The output voltage from the amplifier 12 is compared by means of a level detection and isolation network 18 which includes a diode 50. Below a certain set voltage the diode 50 will conduct and any change in the set output voltage of the amplifier 12 is fed back to the amplifier input by means of a feedback circuit 20 to trigger the amplifier 12 to a new stable condition.

The differential temperature voltage signal is provided by means of a pair of semiconductive junction circuit assemblies 22 and 24 provided in probes 14 and 16, respectively. In the form of the invention shown in the drawing, the circuit assemblies 22 and 24 each include a pair of serially connected diodes $D_1$, $D_2$, and $D_3$, $D_4$ and resistance members 26 and 28, respectively. The circuit assemblies 22 and 24 are connected in parallel across a battery $E_1$. The semiconductor junction voltage across each of the circuit assemblies 22 and 24 is connected to the amplifier 12 through resistance members 30 and 32 to provide input voltage signals to the amplifier 12. The input signals to the amplifier are indicated as positive and negative. The negative sign means that the output signal of the amplifier will be 180° phase inverted, while the positive sign means the output signal will be in phase with the input signals. As shown, the negative input receives the reference probe voltage signal and the positive input the remote probe signal.

The diodes $D_1$, $D_2$, $D_3$ and $D_4$ provide a linear forward voltage drop with a change in temperature at constant DC bias current. In the embodiment disclosed each diode is assumed to have a linear voltage drop characteristic of 2 millivolts per degree centigrade which is called the temperature coefficient of 2mv./° C. This may vary depending on the device used in the probes. In order to achieve a high sensing accuracy over a wide temperature range the diodes $D_1$, $D_2$, $D_3$ and $D_4$ can be matched in proper pairs. The absolute voltage across each semiconductor junction can be modified by changing the DC bias current through the diode. This adjustment can also be used to vary the temperature coefficient if needed. When the temperature at both probes 14 and 16 is equal, the voltage across each of the assemblies 22 and 24 will also be equal and equal voltage will be supplied at the positive and negative inputs to the amplifier 12. However, when a temperature difference exists between the assemblies, a differential voltage will exist across the assemblies which will produce a change in the output voltage of the amplifier. Any PN junction or even multijunction device having a linear temperature-sensitive voltage drop characteristic can be used for sensing temperatures in the sensing network. Such junction devices as thyristors (SCR), multipellet stabistors, tunnel diodes, zener diodes or a transistor can be used in this system. The sensitivity of the temperature-sensing system can be increased by using multiple series connected junction devices in the sensing network.

The differential voltage input signal is amplified by the amplifier 12 and is detected in the form of a voltage across a load resistance member 34 in the output circuit of the amplifier. A voltmeter can be connected in parallel to or in place of resistor 34 to allow monitoring of the differential temperature until the amplifier triggers to perform its control function. The amplifier 12 is a conventional-type operational amplifier connected across the battery $E_1$ and a battery $E_2$. The gain of the amplifier is determined by a reference feedback resistance 35 connected to the negative amplifier input and to the amplifier output and is equal to the resistance 35 divided by the resistance 30. In the embodiment for which values are given below, the resistances have been selected to provide a gain of 330.

The output voltage of the amplifier 12 is set by means of a control circuit 36 which includes a potentiometer 38 connected across the batteries $E_1$, $E_2$ and to the positive amplifier input through a resistance 40. The amplifier is only approximately balanced by a balance resistor 42 connected between the battery $E_1$ and the amplifier 12. A properly balanced amplifier would have a zero output voltage. In this embodiment the output voltage is set to provide a voltage signal when the differential voltage or temperature between the probes is zero.

The output voltage of the amplifier 12, which is proportional to the differential temperature, is used for various electronic controls, such as level detection with trigger action, to provide a signal for control processes with or without memory or holding action or as an alarm system with or without power shutoff. In accordance with the invention, the set output voltage of the amplifier 12 is monitored by means of the level detection and trigger network 18 to trigger the amplifier 12 whenever the output voltage from the amplifier drops below the set output voltage. The level detector and trigger network 18 includes a voltage divider circuit 45 having resistance members 46 and 48 connected in series across batteries $E_1$ and $E_2$. The voltage divider 45 is connected to the amplifier output circuit through the diode 50 which is normally reverse biased by the set output voltage of the amplifier 12. The voltage divider 45 is also connected to the positive input to the amplifier 12 by means of the feedback circuit 20 which includes a resistance member 54. The output voltage of the amplifier is set above or to equal the voltage across the voltage divider 45 at point C by adjusting potentiometer 38. If the output voltage of the amplifier 12 drops below the voltage at point C, the diode 50 will become forward biased and the voltage at point C will follow the drop in the amplifier output voltage. As the voltage at point C starts changing, the voltage change is fed through feedback circuit 20 to the positive input to the amplifier 12. This positive feedback voltage to the amplifier 12 will trigger the amplifier to a far negative potential and will remain there indefinitely. A capacitance 60 can be provided between the the positive input terminal of the amplifier and ground potential which is the plus and minus terminal junction of battery $E_2$ and $E_1$, respectively. This capacitor causes a small time delay for feedback signal and protects against system noise.

Various means can be provided to reset the amplifier 12 such as applying a voltage pulse or signal by means of a control device 62 connected to the negative input to the amplifier 12 to override the voltage signal from the feedback circuit 20. The output voltage from the amplifier is raised far enough to reverse bias diode 50, thereby reducing the feedback voltage to zero. The voltage signal from the amplifier when triggered is used as the means for effecting the return of the temperature-responsive network to a balanced condition by actuating a control device 64 located near the reference probe 16.

In a specific embodiment, the following values for the parts described have been used successfully. As indicated above, each of the diodes $D_1$, $D_2$, $D_3$ and $D_4$ has a linear voltage drop characteristic of 2 millivolts per degree centigrade. The resistance values are as follows:

| Resistance Member Number | Values |
| --- | --- |
| 26 and 28 | 470 ohms |
| 30 and 32 | 1000 ohms |
| 34 | 5000 ohms |
| 35 | 330,000 ohms |
| 40 | 100,000 ohms |
| 42 | 33,000 ohms |
| 46 | 10,000 ohms |
| 48 | 9,100 ohms |
| 54 | 62,000 ohms |
| Potentiometer 38 | 10,000 ohms |
| Capacitance 60 | 0.1 microfarad |

The amplifier gain is equal to resistance 35 divided by resistance 30 equals 330 k/1k = 330.

An initial output voltage is set by adjusting the potentiometer 38 which feeds an additional voltage through resistance member 54 to the positive input. After a specific set output voltage is established and if the temperature on both sensing probes changes by an identical amount, the voltage differential between the circuit assemblies will remain at zero and the amplifier output will not deviate from its original set point value. If the diodes have been properly matched, the linear changes of forward voltage versus temperature for constant current can be made equal over the temperature range from −65° C. to +180° C. and no voltage change will occur. However, a different temperature at the probes will trigger a very large output voltage, due to positive feedback, which will continue until the unit is manually or automatically reset when the probe temperatures are equal.

What is claimed is:

1. A differential-temperature-detecting system comprising a differential amplifier including means for balancing said amplifier to provide a predetermined output voltage and having a pair of inputs, a temperature reference probe and a remote temperature-sensing probe, said probes comprising semiconductor junctions having poles disposed in opposite directions with respect to respective inputs of said differential amplifier, said probes being connected to said amplifier inputs for providing a voltage signal in response to a change in temperature between the temperature at the reference probe and the temperature at the remote probe, a positive feedback circuit connected to trigger said amplifier to a stable high output condition in response to a small change in the set output voltage, and means to detect the change in output voltage from the predetermined output voltage of said amplifier.

2. A temperature-sensing system according to claim 1 wherein said detecting means includes a voltage divider circuit and a diode connected between the amplifier and the voltage divide.

3. A temperature-sensing system according to claim 2 wherein said feedback circuit is connected to said voltage divide.

4. A temperature-sensing system according to claim 1 wherein each of the reference probe and the remote probe include a pair of diodes arranged to conduct current in the same direction, said diodes having linear forward voltage drop characteristics, said reference probe and said remote probe being matched in said voltage drop characteristics.

5. A temperature-sensing system according to claim 1 further comprising means to apply a voltage pulse to said amplifier to return the output voltage to said predetermined value.